UNITED STATES PATENT OFFICE.

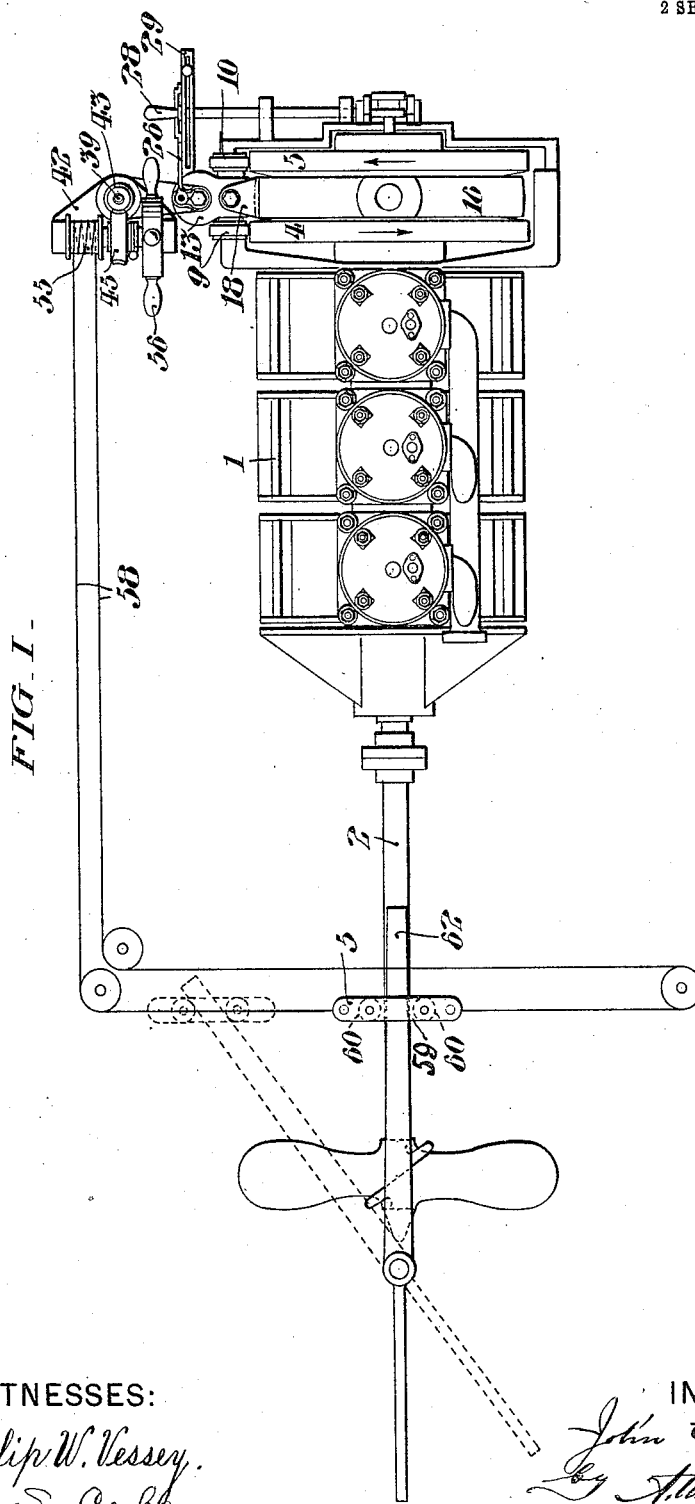

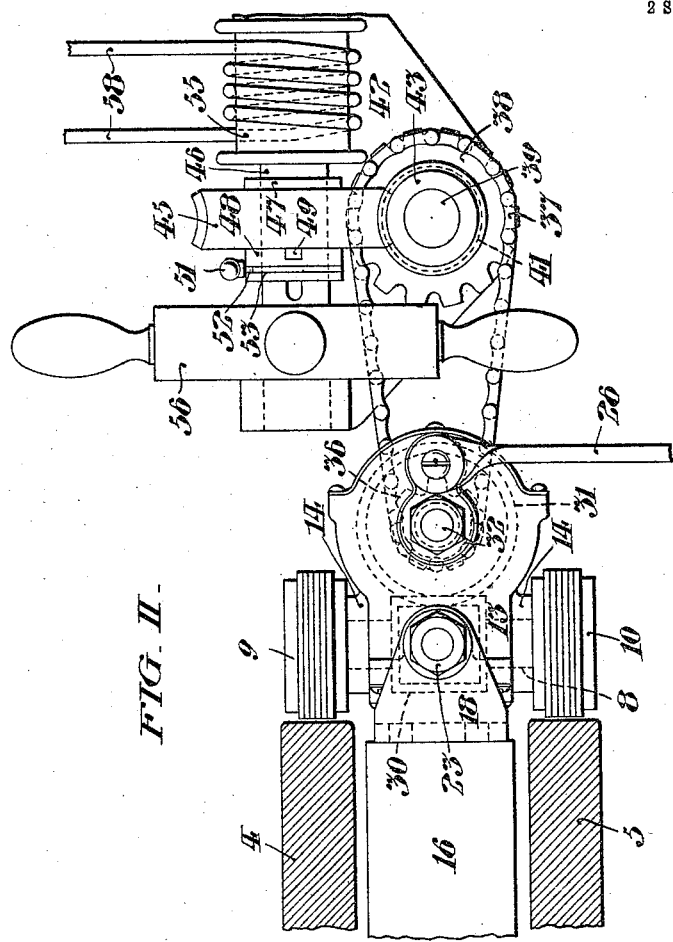

JOHN C. R. MARCH, OF PERTH AMBOY, NEW JERSEY.

STEERING-GEAR.

1,059,744.   Specification of Letters Patent.   Patented Apr. 22, 1913.

Application filed November 26, 1912. Serial No. 733,715.

*To all whom it may concern:*

Be it known that I, JOHN C. R. MARCH, of Perth Amboy, in the State of New Jersey, have invented a certain new and useful Improvement in Steering-Gear, whereof the following is a specification, reference being had to the accompanying drawings.

My invention is particularly applicable to steering a marine vessel although not restricted to such use, and, as hereinafter described, is adapted to coöperate with a double fly wheel of an internal combustion engine, being the motor of such a vessel, including two opposite beveled wheels normally loose on the main shaft of the engine and having means whereby they may be continuously rotated, in opposite directions, by the engagement of one or the other of them with said shaft, in accordance with the direction of rotation of the latter. The form of said steering mechanism hereinafter described includes a worm shaft carrying friction driving pinions respectively opposed to said two, oppositely rotary, wheels of said engine fly wheel; said screw shaft having means to oscillate it to engage one or the other of said pinions in operative relation with said fly wheel so as to drive said worm shaft in the corresponding direction. Said wormshaft carries a worm in engagement with a worm gear operatively connected with a drum on which is wound a tiller rope which is operatively engaged with the tiller of said marine vessel; so that said tiller may be shifted in either direction in accordance with the engagement of one or the other of said pinions with said fly wheel or may be held stationary while said pinions are both held out of engagement with respect to said fly wheel.

My invention includes the farious novel features of construction and arrangement hereinafter more definitely specified.

In the drawings; Figure I is a diagrammatic plan view showing a convenient embodiment of my invention in operative relation with a marine vessel tiller and an internal combustion marine engine provided with a double fly wheel such as above described, and operatively connected with a propeller. Fig. II is a fragmentary plan view of the steering gear indicated in Fig. I, but on a larger scale. Fig. III is a fragmentary elevation of said steering gear as seen from the lower side of Fig. II.

In said figures; 1 indicates an internal combustion marine engine having the main crank shaft 2 provided with the double fly wheel including the opposite counterpart beveled wheels 4 and 5 which are normally loose with respect to said shaft but are provided with means arranged to rotate them in opposite directions in connection with said shaft; said fly wheel mechanism being constructed and arranged, conveniently as described in my copending application Serial #733714, filed November 26, 1912 for Letters Patent of the United States for improvement in fly wheels; said arrangement being such that during the rotation of said shaft 2, in either direction, said wheels 4 and 5 are continuously rotated, in respectively opposite directions, indicated by the arrows marked thereon, said shaft 2 being operatively connected with whichever of said wheels 4 or 5 is turning in the direction of rotation of said shaft 2.

The steering gear which is adapted to coöperate with said wheels 4 and 5, or any other pair of driving wheels turning in respectively opposite directions, includes the oscillatory screw shaft 8 carrying the two friction pinions 9 and 10 having resilient friction surfaces conveniently formed of disks of raw hide, as indicated in Fig. II, respectively opposed to said two fly wheels 4 and 5. The housing 13 having the bearings 14 for said screw shaft 8 is supported for oscillation with said screw shaft, conveniently on the stationary frame 16 between said fly wheels 4 and 5 which is provided with the vertical pivotal bearings 17 and 18; the former being in integral relation with said frame 16, and the bearing 18 being separable from said frame 16 but rigidly connected therewith by the bolts 19, indicated in Fig. III. As shown in Fig. III said housing 13 has the pivot shaft 21 fitted in said pivot bearing 17 and has the pivot socket 22 which receives the pivot bolt 23 which is conveniently in screw threaded engagement with said bearing 18. Said housing is conveniently oscillated by means of the stud 25 thereon eccentric to said pivotal bearings and pivotally connected by the link 26 with the hand lever 28 which may be rocked in the sectoral frame 29 and is provided with a detent for holding said lever in either extreme or in the central position as indicated, in which position said pinions 9 and 10 are inoperative. It is to be understood that in the extreme position of said lever 28 to the left in Fig. I, the pinion 9 is pressed into operative engagement with the fly wheel 4 so as to be rotated by the latter and rotate said screw shaft 8 accordingly, and, that in the other extreme position of said lever 28 the pinion 10 is pressed into operative engagement with the fly wheel 5 so that said shaft 8 is rotated in the opposite direction. Said screw shaft 8 carries the worm 30 in said housing 13, in engagement with the worm gear 31 in said housing carried by the shaft 32 extending vertically in the housing journals 34. Said shaft 32 has the sprocket wheel 36 upon the lower end thereof connected by the chain belt 37 with the sprocket wheel 38 on the countershaft 39 which extends parallel with said worm gear shaft 32 in journals 41 in the bearing bracket 42 and is provided with the worm 43 engaging the drum worm gear 45 which is loosely mounted on the drum shaft 46 between the collar 47, which is rigid on said drum shaft, and the clutch collar 48 which is keyed on said drum shaft and axially movable thereon to engage and disengage the clutch member 49 on said drum worm gear 45. Said clutch may be shifted by any suitable means, conveniently the lever 51 having the stud 52 engaging the groove 53 in said clutch collar 48. Said drum shaft 46 carries the drum 55, and it is to be understood that the clutch mechanism aforesaid is to enable the operator to either connect said drum shaft 46 so as to be driven by the engine fly wheel, or, to free said drum shaft 46 so that the drum may be manually rotated by the steering wheel 56 independently of the power driving means aforesaid.

The endless tiller rope 58 which encircles said drum 55 to such an extent as to be operatively connected therewith, carries the tiller yoke 59 provided with the friction rollers 60 operatively engaged with the tiller 62, whereby the latter may be turned in either direction by operative connection with either of said fly wheels, or manually by said steering wheel, at the will of the operator.

Although I have described my invention as applied to an internal combustion marine engine it is to be understood that it is applicable to a motor of any kind provided with driving wheels rotatable in respectively opposite directions to drive the friction pinions 9 and 10; for instance, my invention may be advantageously employed in connection with a hoisting engine or motor to control the drum carrying the hoisting rope so as to shift the latter in either direction by oscillation of the housing 13, or the equivalent thereof. Therefore, I do not desire to limit myself to the precise details of construction and arrangement herein set forth as it is obvious that various modifications may be made therein without departing from the essential features of my invention as defined in the appended claims.

I claim:—

1. The combination with a marine engine having a double fly wheel including two wheels and means arranged to rotate them in opposite directions; of an oscillatory screw shaft carrying two friction pinions respectively opposed to said two fly wheels; a housing for said screw shaft; means supporting said housing for oscillation with said screw shaft, including a stationary frame between said fly wheels and vertical pivotal bearings in said frame; means arranged to oscillate said housing, including a stud on said housing eccentric to said pivotal bearings, a link pivotally connected with said stud; and a hand lever pivotally connected with said link; a worm on said worm shaft in said housing; a worm gear in said housing in engagement with said worm; a shaft for said worm gear extending vertically in journals in said housing; a sprocket wheel upon the lower end of said worm gear shaft; a counter shaft extending parallel with said worm gear shaft; a sprocket wheel on said countershaft; a chain belt connecting said two sprocket wheels; a worm on said countershaft; a drum worm gear engaging said countershaft worm; a drum shaft extending loosely through said drum worm gear and carrying a drum; a clutch member on said drum worm gear; a clutch collar keyed on said drum shaft and axially movable thereon to engage and disengage the clutch member on said drum worm gear; means arranged to shift said clutch including a lever having a stud engaging a groove in said clutch collar; a manual steering wheel on said drum shaft; an endless tiller rope encircling said drum and carrying a tiller yoke; and, a tiller operatively engaged by said yoke; whereby said tiller may be turned in either direction by operative connection with either of said fly wheels, and manually by said steering wheel.

2. The combination with a marine engine having a double fly wheel including two wheels and means arranged to rotate them in opposite directions; of an oscillatory screw shaft carrying two friction pinions respectively opposed to said two fly wheels; a housing for said screw shaft; means supporting said housing for oscillation with said screw shaft; means arranged to oscillate said housing; a worm on said worm shaft in said housing; a worm gear in said housing in engagement with said worm; a shaft for said worm gear extending vertically in journals in said housing; a sprocket wheel upon the lower end of said worm gear shaft; a countershaft extending parallel with said worm gear shaft; a sprocket wheel on said countershaft; a chain belt connecting said two sprocket wheels; a worm on said countershaft; a drum worm gear engaging said countershaft worm; a drum shaft extending loosely through said drum worm gear and carrying a drum; a clutch member on said drum worm gear; a clutch collar keyed on said drum shaft and axially movable thereon to engage and disengage the clutch member on said drum worm gear; means arranged to shift said clutch including a lever having a stud engaging a groove in said clutch collar; a manual steering wheel on said drum shaft; an endless tiller rope encircling said drum and carrying a tiller yoke; and, a tiller operatively engaged by said yoke; whereby said tiller may be turned in either direction by operative connection with either of said fly wheels, and manually by said steering wheel.

3. The combination with a marine engine having a double fly wheel including two wheels and means arranged to rotate them in opposite directions; of an oscillatory screw shaft carrying two friction pinions respectively opposed to said two fly wheels; a housing for said screw shaft; means supporting said housing for oscillation with said screw shaft; means arranged to oscillate said housing; a worm on said worm shaft in said housing; a worm gear in said housing in engagement with said worm; a shaft for said worm gear extending vertically in journals in said housing; a wheel upon the lower end of said worm gear shaft; a countershaft extending parallel with said worm gear shaft; a wheel on said countershaft, operatively connected with the wheel on said worm gear shaft; a worm on said countershaft; a drum worm gear engaging said countershaft worm; a drum shaft extending loosely through said drum worm gear and carrying a drum; a clutch member on said drum worm gear; a clutch collar keyed on said drum shaft and axially movable thereon to engage and disengage the clutch member on said drum worm gear; means arranged to shift said clutch including a lever having a stud engaging a groove in said clutch collar; a manual steering wheel on said drum shaft; an endless tiller rope encircling said drum and carrying a tiller yoke; and, a tiller operatively engaged by said yoke; whereby said tiller may be turned in either direction by operative connection with either of said fly wheels, and manually by said steering wheel.

4. The combination with a marine engine having a double fly wheel including two wheels and means arranged to rotate them in opposite directions; of an oscillatory screw shaft carrying two friction pinions respectively opposed to said two fly wheels; a housing for said screw shaft; means supporting said housing for oscillation with said screw shaft; means arranged to oscillate said housing; a worm on said worm shaft in said housing; a worm gear in said housing in engagement with said worm; a shaft for said worm gear extending vertically in journals in said housing; a wheel upon the lower end of said worm gear shaft; a countershaft extending parallel with said worm gear shaft; a wheel on said countershaft, operatively connected with the wheel on said worm gear shaft; a worm on said countershaft; a drum worm gear engaging said countershaft worm; a drum shaft extending through said drum worm gear and carrying a drum; an endless tiller rope encircling said drum and carrying a tiller yoke; and, a tiller operatively engaged by said yoke; whereby said tiller may be turned in either direction by operative connection with either of said fly wheels, and manually by said steering wheel.

5. The combination with a motor having two driving wheels and means arranged to rotate them in opposite directions; of an oscillatory screw shaft carrying two friction pinions respectively opposed to said two driving wheels; a housing for said screw shaft; means supporting said housing for oscillation with said screw shaft; means arranged to oscillate said housing; a worm on said worm shaft in said housing; a worm gear in said housing in engagement with said worm; a shaft for said worm gear extending vertically in journals in said housing; a sprocket wheel upon the lower end of said worm gear shaft; a countershaft extending parallel with said worm gear shaft; a sprocket wheel on said countershaft; a chain belt connecting said two sprocket wheels; a worm on said countershaft; a drum worm gear engaging said countershaft worm; a drum shaft extending through said drum worm gear and carrying a drum; an endless tiller rope encircling said drum and carrying a tiller yoke; and, a tiller operatively engaged by said yoke; whereby said tiller may be turned in either direction by operative connection with either of said driving wheels.

6. The combination with a motor having two driving wheels and means arranged to rotate them in opposite directions; of an oscillatory screw shaft carrying two friction pinions respectively opposed to said two driving wheels; a housing for said screw shaft; means supporting said housing for oscillation with said screw shaft; means arranged to oscillate said housing; a worm on said worm shaft in said housing; a worm gear in said housing in engagement with said worm; a shaft for said worm gear extending vertically in journals in said housing; a wheel upon the lower end of said worm gear shaft; a countershaft extending parallel with said worm gear shaft; a wheel on said countershaft, operatively connected with the wheel on said worm gear shaft; a worm on said countershaft; a drum worm gear engaging said countershaft worm; a drum shaft extending through said drum worm gear and carrying a drum; an endless tiller rope encircling said drum and carrying a tiller yoke; and, a tiller operatively engaged by said yoke; whereby said tiller may be turned in either direction by operative connection with either of said driving wheels.

7. The combination with a motor having two driving wheels and means arranged to rotate them in opposite directions; of an oscillatory screw shaft carrying two friction pinions respectively opposed to said two driving wheels; a housing for said screw shaft; means supporting said housing for oscillation with said screw shaft; means arranged to oscillate said housing; a worm on said worm shaft in said housing; a worm gear in said housing in engagement with said worm; a shaft for said worm gear extending vertically in journals in said housing; a wheel upon the lower end of said worm gear shaft; a countershaft extending parallel with said worm gear shaft; a wheel on said countershaft, operatively connected with the wheel on said worm gear shaft; a worm on said countershaft; a drum worm gear engaging said countershaft worm; a drum shaft extending through said drum worm gear and carrying a drum; a tiller rope connected with said drum; and, a tiller operatively engaged by said rope; whereby said tiller may be turned in either direction by operative connection with either of said driving wheels.

8. The combination with a motor having two driving wheels and means arranged to rotate them in opposite directions; of an oscillatory screw shaft carrying two pinions respectively opposed to said two driving wheels; a housing for said screw shaft; means supporting said housing for oscillation with said screw shaft; means arranged to oscillate said housing; a worm on said worm shaft in said housing; a worm gear in said housing in engagement with said worm; a shaft for said worm gear extending vertically in journals in said housing; a wheel on said worm gear shaft; a countershaft extending parallel with said worm gear shaft; a wheel on said countershaft, operatively connected with the wheel on said worm gear shaft; a drum operatively connected with said countershaft; a tiller rope operatively connected with said drum; and, a tiller operatively engaged by said rope; whereby said tiller may be turned in either direction by operative connection with either of said driving wheels.

9. The combination with a motor having two driving wheels and means arranged to rotate them in opposite directions; of an oscillatory shaft carrying two pinions respectively opposed to said driving wheels; a tiller operatively connected with said shaft; and, means arranged to oscillate said shaft whereby the latter may be rotated in either direction and said tiller may be turned in either direction by operative connection with either of said driving wheels.

10. The combination with a motor having two driving wheels and means arranged to rotate them in opposite directions; of an oscillatory shaft carrying two pinions respectively opposed to said driving wheels; a drum operatively connected with said shaft; and, means arranged to oscillate said shaft whereby the latter may be rotated in either direction and said drum may be turned in either direction by operative connection with either of said driving wheels.

11. The combination with a motor having two driving wheels and means arranged to rotate them in opposite directions; of an oscillatory shaft carrying two pinions respectively opposed to said driving wheels; and, means arranged to oscillate said shaft whereby the latter may be rotated in either direction by operative connection with either of said driving wheels.

In testimony whereof, I have hereunto signed my name at Perth Amboy, New Jersey, this eleventh day of November, 1912.

JOHN C. R. MARCH.

Witnesses:
E. JACKSON,
OLGA JORGENSEN.

---

Copies of this patent may be obtained for five cents each, by addressing the "Commissioner of Patents, Washington, D. C."

Correction in Letters Patent No. 1,059,744.

It is hereby certified that in Letters Patent No. 1,059,744, granted April 22, 1913, upon the application of John C. R. March, of Perth Amboy, New Jersey, for an improvement in "Stearing-Gears," an error appears in the printed specification requiring correction as follows: Page 1, line 41, for the word "farious" read *various;* and that the said Letters Patent should be read with this correction therein that the same may conform to the record of the case in the Patent Office.

Signed and sealed this 20th day of May, A. D., 1913.

[SEAL.]

C. C. BILLINGS,

*Acting Commissioner of Patents.*